(12) United States Patent
Xiao et al.

(10) Patent No.: US 11,134,708 B2
(45) Date of Patent: Oct. 5, 2021

(54) NUTRITIONAL RECOMBINATION RICE AND PREPARATION METHOD THEREOF

(71) Applicant: Shenyang Normal University, Shenyang (CN)

(72) Inventors: Zhigang Xiao, Shenyang (CN); Qingyu Yang, Shenyang (CN); Liwei Tao, Shenyang (CN); Lishuang Wang, Shenyang (CN); Na Wang, Shenyang (CN); Quanfeng Zhang, Shenyang (CN); Songli Zhou, Shenyang (CN); Guoqiang Yang, Shenyang (CN)

(73) Assignee: SHENYANG NORMAL UNIVERSITY, Shenyang (CN)

( * ) Notice: Subject to any disclaimer, the term of this patent is extended or adjusted under 35 U.S.C. 154(b) by 0 days.

(21) Appl. No.: 16/425,979

(22) Filed: May 30, 2019

(65) Prior Publication Data

US 2020/0404953 A1    Dec. 31, 2020

(51) Int. Cl.
| | | |
|---|---|---|
| *A23L 7/17* | (2016.01) | |
| *A23L 5/10* | (2016.01) | |
| *A23L 19/10* | (2016.01) | |
| *A23L 5/30* | (2016.01) | |

(52) U.S. Cl.
CPC ............... *A23L 7/17* (2016.08); *A23L 5/15* (2016.08); *A23L 5/34* (2016.08); *A23L 19/10* (2016.08)

(58) Field of Classification Search
CPC ..... A23L 7/10; A23L 7/17; A23L 5/15; A23L 5/34; A23L 19/10

USPC ....................................................... 426/516
See application file for complete search history.

(56) References Cited

U.S. PATENT DOCUMENTS

2018/0146688 A1*   5/2018   Granato Villas Boas ................. A21D 13/066

FOREIGN PATENT DOCUMENTS

| CN | 102793127 A | * | 11/2012 |
|---|---|---|---|
| CN | 102823822 A | * | 12/2012 |
| CN | 106798325 A | * | 6/2017 |
| CN | 107692121 A | * | 2/2018 |

* cited by examiner

*Primary Examiner* — Jyoti Chawla
(74) *Attorney, Agent, or Firm* — W&G Law Group

(57) ABSTRACT

The present disclosure discloses an artificial rice and a preparation method thereof. The method includes the following steps: pre-curing quinoa by microwave irradiation after pretreatment; evenly mixing the pre-cured taro whole powder and the pre-cured quinoa powder with a banana powder, a kiwifruit powder and a molecular distillation monoglyceride; and quantitatively adding a tempered composite material into a twin-screw extrusion machine through a feeder; setting a working temperature of a cavity of each machine section of the twin-screw extrusion machine, in which a temperature gradient in Zone I is 45° C. to 65° C., Zone II 75° C. to 95° C., Zone III 115° C. to 135° C., Zone IV 105° C. to 115° C., Zone V 20° C. to 35° C., a rotation speed of a screw is 120 rpm to 370 rpm; obtaining the artificial rice after drying and polishing.

5 Claims, 3 Drawing Sheets

(a) (b) (c)

NUTRITIONAL RECOMBINATION RICE AND PREPARATION METHOD THEREOF

CROSS-REFERENCE TO RELATED DISCLOSURES

The present application claims priority to Chinese Patent Disclosure No. 201810587036.2, filed on Jun. 6, 2018, the content of which is incorporated herein by reference in its entirety.

TECHNICAL FIELD

The present disclosure relates to the technical field of food deep processing, and in particular, to a nutritional artificial rice and a preparation method of the nutritional artificial rice.

BACKGROUND

It is recognized by the United Nations Food and Agriculture Organization (FAO) that quinoa is the only monomer plant that can meet the basic nutritional needs of the human body and is officially recommended as the perfect "full nutrition food" that is most suitable for human beings. Its nutrition value is much higher than traditional cereals such as wheat, rice and corn, and it is not only rich in protein and micronutrients such as calcium, iron, zinc and vitamin E, but also contains all essential amino acids. Moreover, it is also rich in phytochemicals such as polyphenols, flavonoids and saponins, such that it has the potential effect to improve the nutrition level of the population and prevent the occurrence of various diseases. quinoa has low contents of glucose and fructose, and the glycemic index rises only 30% of rice after consumption. The full nutrition properties of quinoa give it a variety of physiological effects such as anti-tumor, endocrine improvement, immunity enhancement, and weight loss. quinoa is suitable for all people, including patients with chronic diseases such as patients suffering from hypertension-hyperlipidemia-hyperglycemia and patients having heart disease, as well as special physique groups such as infants, pregnant women, the elderly, and people allergic to gluten.

Taro is a very good alkaline food, which has a soft taste as well as is sweet and sticky, and its nutrition value is similar to that of potatoes. In addition, it does not contain solanine, and thus is easy to be digested and absorbed without causing poisoning. Taro contains a variety of nutrients such as carotene, niacin, vitamin E and vitamin A. In addition, Taro also has a variety of nutritional effects: capable of benefiting the spleen and stomach, adjusting the Middle-Qi, dissipating the phlegm and dissolving lumps; having a relatively high fluorine content and thus having the function of cleaning teeth and preventing teeth decay and protecting teeth; containing a variety of trace elements to enhance the body's immune function.

Banana are rich in nutrients, contain a variety of minerals and vitamins that the human body needs, have a relatively high content of potassium and are typical high-potassium and low-sodium fruit. Potassium has an inhibitory effect on sodium in the human body, can lowers blood pressure and prevents hypertension and heart disease. Moreover, bananas also contain active nutrients such as dietary fiber, polysaccharides, total flavonoids, total polyphenols and organic acids and so on, and thus have extremely high nutrition and health value. Further, bananas have a natural resistant starch content of more than 50% and are one of the fruits and vegetables with a high content of natural resistant starch (Resistant Starch, RS). A large number of studies have found that natural resistant starch can reduce serum cholesterol and triglyceride levels, delay gastric emptying and increase satiety. Because resistant starch and dietary fiber benefit the control of body weight and resistance to obesity and diabetes, bananas and their processed products such as banana powder are increasingly popular among consumers.

Kiwifruit contains a variety of vitamins and fats, proteins, amino acids and calcium, phosphorus, iron, magnesium, pectin and other nutrients. It contains high vitamin C content that can be 400-430 mg per 100 g of kiwifruit. Kiwifruit also contains a variety of vitamin E, vitamin K and the like, is a low-fat food rich in nutrients and dietary fiber and has unique effects on bodybuilding and beauty. In addition, kiwifruit is rich in folic acid, which is one of the essential substances for building healthy body and can prevent neural tube defects in embryonic development. Kiwifruit is also rich in lutein, and the accumulation of lutein on the retina can have effect such as preventing spots from deteriorating.

Diabetes is a kind of metabolic diseases characterized by high blood sugar. In 2017, the number of diabetic patients worldwide (20-79 years old) reached 425 million, and the number of diabetic patients in China is 114.4 million, ranking the first in the world. Diabetic patients should avoid eating foods such as all kinds of sugar, candied fruit, high cholesterol food and animal fat, while foods such as whole grains, beans and soy products and bitter gourd, mulberry leaves, onions, grapefruit are beneficial to them. For diabetic patients, the intake of whole grains is very good way to control the intake of staple foods, since grains can lower the blood sugar to a certain extent.

Chinese invention patent (application publication number: CN102823822A, granted publication date: Dec. 19, 2019) discloses a corn artificial rice and a preparation method thereof. The preparation method includes the following steps: pulverizing ordinary corn after peeling and degerming to obtain an ordinary corn flour; mixing a modified corn flour with the ordinary corn flour according to a certain ratio (a mass percentage of the enzyme-modified corn flour is 1-10%, a mass percentage of the twin-screw modified corn flour is 45-75%, and a mass percentage of the ordinary corn flour is 15-50%) to obtain a compounded flour; tempering the compounded flour and then performing extrusion molding, cutting granulation, hot air drying, and polishing to obtain corn artificial rice. However, in this patent, the artificial rice has poor anti-regeneration performance and is of high production cost.

Chinese invention patent (application publication number: CN107692121A, granted publication date: Feb. 16, 2018) discloses a processing method of a high-fiber parent-taro artificial rice and an edible method thereof. The preparation method includes removing the anti-nutritional factor (calcium oxalate) from the fresh parent-taro by soaking; obtaining parent-taro flour after drying and pulverizing; then mixing evenly with broken rice flour, coarse cereals (quinoa powder, glutinous rice flour and/or oat flour); preparing the high-fiber parent-taro artificial rice by adopting twin-screw extrusion technology through processes such as extrusion curing, cutting molding, hot air drying, and packaging. However, the nutrition of the prepared artificial rice is not comprehensive enough.

Chinese invention patent (application publication number: CN101138427A, granted publication date: Mar. 12, 2008) discloses an artificial konjac rice having targeting action and a preparation method thereof. The preparation includes: using raw materials such as coarse grains, raw materials of fruits and vegetables, rice bran and konjac flour as crude materials; expanding, pulverizing, stirring, extruding, granulating, air- or freeze-drying, polishing and granulating the crude materials to prepare the rice above. However, the artificial konjac rice lost a large amount of nutrients after granulation and is not resistant to cooking.

SUMMARY

The present disclosure discloses a nutritional artificial rice and a preparation method of the nutritional artificial rice. The preparation method uses quinoa powder and taro whole powder as raw materials, the raw material is added with appropriate amount of banana powder, kiwifruit powder and molecular distillation monoglyceride, the quinoa powder and the taro whole powder are pre-cured by microwave irradiation and then evenly mixed with other materials, so as to obtain the functional nutritional artificial rice product after granulation molding, drying and polishing. The method can protect the nutrients in quinoa and taro, and the extrusion and swelling process facilitate the integration of quinoa, taro and nutrients. In addition, the resistant starch content in the artificial rice is increased, which is conducive to the improvement of satiety. Moreover, the artificial rice is rich in nutrients, has improved taste quality, and is especially suitable for people whose are losing weight and diabetic patients.

The present disclosure discloses a nutritional artificial rice and a preparation method thereof, where, the proportions of quinoa flour and taro whole powder are 60% to 90% and 10% to 40%, respectively. 0.1% to 0.5% of a molecular distillation monoglyceride, 0% to 10% of banana powder and 0% to 5% of kiwifruit powder are added.

Specifically, the taro whole powder and the quinoa powder are made of taro and quinoa powder, respectively. The taro needs to be treated by beating, and the quinoa needs to be treated by soaking.

The preparation method of the nutritional artificial rice includes the following steps:

(1) pretreating the quinoa: removing impurities adhered to a surface of the quinoa and then sufficiently soaking the quinoa in water for 5 min to 40 min at a soaking temperature of 20° C. to 40° C. in such a manner that particles of the quinoa sufficiently absorb water and swell, and then drying the quinoa to be standby;

(2) pretreating of the taro: removing impurities adhered to a surface of the taro, peeling the taro, adding water with a material-to-water ratio of 1:2-3 (W/W) to beat the taro, and drying the taro to be standby;

(3) pulverizing: pulverizing the pretreated quinoa and the pretreated taro, and then sieving with an 80-200 mesh sieve to obtain the quinoa powder and the taro whole powder;

(4) ball-milling the quinoa powder: treating the sieved quinoa powder through a ball mill to be standby, wherein parameters of the ball mill comprise: a capacity of a ball-milling tank being 150 mL to 650 mL, a rotation speed of the ball mill being 200 r/min to 550 r/min, a milling time being 10 min to 200 min, and a ball-to-material ratio being (1 to 10):1;

(5) pre-curing the taro whole powder and the quinoa powder in separate steps;
pre-curing of the taro whole powder: microwave irradiation power is 100-300 W, irradiation time 1-5 min, moisture of the taro whole powder is 10-30%;
pre-curing of the quinoa powder: microwave irradiation power is 200-400 W, irradiation time 2-6 min, moisture of the quinoa powder is 10-35%;

(6) premixing: in a percentage of a total weight of the taro whole powder and the quinoa powder, weighing 10% to 40% of the taro whole powder and 60% to 90% of the quinoa powder, and then adding 0.1% to 0.5% of the molecular distillation monoglyceride, 0% to 10% of the banana powder and 0% to 5% of the kiwifruit powder;

(7) tempering: mixing the quinoa powder, the taro whole powder, the banana powder, the kiwifruit powder and the molecular distillation monoglyceride in a mixer, and adjusting a water content of the mixture into a range of 20% to 45%;

(8) granulation molding: quantitatively adding a tempered composite material into a twin-screw extrusion machine through a feeder, wherein the machine is a co-directional or a counter-directional rotating twin-screw extrusion machine having a three-section temperature control and a length-to-diameter ratio of (16 to 26):1; setting a working temperature of a cavity of each machine section of the twin-screw extrusion machine, wherein a temperature gradient in Zone I is 45° C. to 65° C., Zone II 75° C. to 95° C., Zone III 115° C. to 135° C., Zone IV 105° C. to 115° C., Zone V 20° C. to 35° C., a rotation speed of a screw is 120 rpm to 370 rpm; extruding the composite material by a mold having a circular mold hole with a diameter of 1 mm to 7 mm, wherein the composite material is formed as gelatinization particles during conveying, extruding and curing through the twin-screw extrusion machine;

(9) low-temperature fluidized bed drying: drying the nutritional artificial rice at a temperature of 40° C. to 60° C. for 1-8 h until the water content is 8% to 12%;

(10) polishing: performing polishing treatment after finishing the drying;

(11) packaging: weighing and then packaging the polished nutritional artificial rice.

The present disclosure can bring the following beneficial effects:

1. In the present disclosure, the raw materials are pre-cured to increase the gelatinization degree of the artificial rice, and thus the artificial rice is more easily formed during the granulation process, which shortens the cooking time of the artificial rice during the cooking process.

2. Due to the addition of the quinoa powder, the taro whole powder, the banana powder, the kiwifruit powder and the molecular distillation monoglyceride, the artificial rice prepared by the present disclosure has rich nutrient compositions, and thus has a comprehensive nutritional value.

3. The functional nutritional artificial rice prepared by the present disclosure has an improved resistance to digestion, which is beneficial to improving satiety, and thus the functional nutritional artificial rice is more suitable for people that are losing weight or diabetic patients.

DESCRIPTION OF EMBODIMENTS

Figure 1:
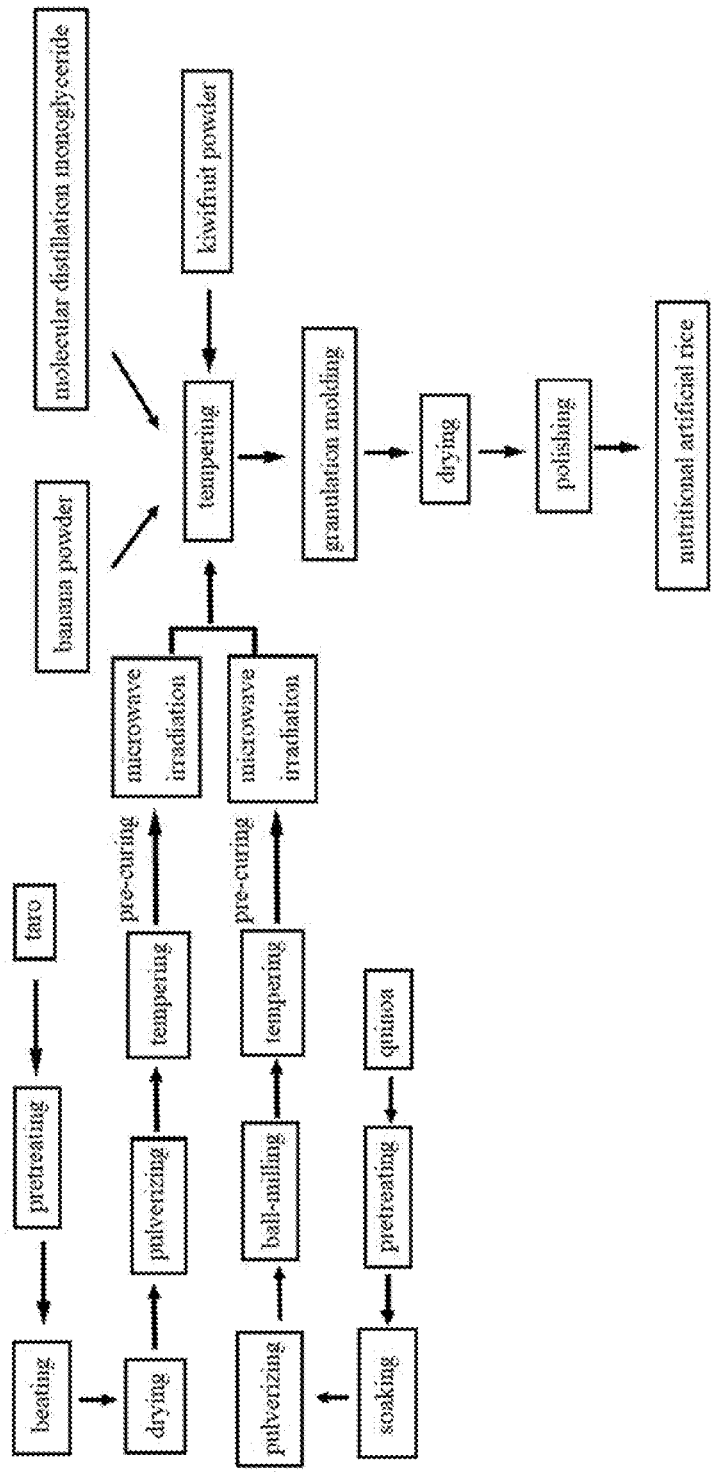
FIG. 1 is a flow chart of preparing process of a nutritional artificial rice according to the present disclosure.

In order to make the objects, technical solutions and advantages of the present disclosure clearer, the present disclosure will be further described in detail below with reference to the accompanying drawings. It is understood that the specific embodiments described herein are merely illustrative of the present disclosure and are not intended to limit the present disclosure.

Embodiment 1

The present disclosure provides a nutritional artificial rice and a preparation method thereof, and the specific steps are described as follows:

The quinoa is washed in clean water and then soaked for 10 min at a soaking temperature of 20° C. The taro, after being peeled, is added with water according to a material-to-water ratio of 1:2 (W/W) to be beaten. The pretreated quinoa and taro are dried, pulverized and sieved with a 100-mesh sieve. The ball mill processing parameters for the quinoa powder are as follows: a capacity of a ball-milling tank is 200 mL, a rotation speed of the ball mill is 300 r/min, the milling time is 60 min, and a ball-to-material ratio is 4:1. The taro whole powder and the quinoa powder are pre-cured by microwave irradiation. With respect to the taro whole powder, a microwave power is 100 W, a microwave pre-curing time is 4 min, and a water content of the material is 10%. With respect to the quinoa powder, the microwave power of is 200 W, the microwave pre-curing time is 5 min, and the water content of the material is 15%. 1800 g of quinoa powder, 200 g of taro whole powder, 80 g of banana powder, 40 g of kiwifruit powder, and 4 g of molecular distillation monoglyceride are evenly mixed and then tempered. After the tempering, the water content of the rice composite reaches 20%. A working temperature of a cavity of each machine section of the twin-screw extrusion machine is set as follows: a temperature gradient in Zone I is 45° C., Zone II 75° C., Zone III 115° C., Zone IV 105° C., and Zone V 20° C. The rotation speed of the screw is 200 rpm. After granulation and formation, the rice composite is dried through a low temperature fluidized bed at 40° C. for 3 h until the water content is 8%. After classification and packing into a finished product, the functional nutritional artificial rice is obtained.

Embodiment 2

The present disclosure provides a nutritional artificial rice and a preparation method thereof, and the specific steps are as follows:

The quinoa is washed in clean water and then soaked for 20 min at the soaking temperature of 30° C. The taro, after being peeled, is added with water according to a material-to-water ratio of 1:2.5 (W/W) to be beaten. The pretreated quinoa and taro are dried, pulverized and sieved with a 100-mesh sieve. The ball mill processing parameters for the quinoa powder are as follows: a capacity of a ball-milling tank is 400 mL, a rotation speed of the ball mill is 400 r/min, the milling time is 90 min, and a ball-to-material ratio is 6:1. The taro whole powder and the quinoa powder are pre-cured by microwave irradiation. With respect to the taro whole powder, the microwave power is 200 W, the microwave pre-curing time is 3 min, and the water content of the material is 20%. With respect to the quinoa powder, the microwave power is 300 W, the microwave pre-curing time is 4 min, and the water content of the material is 25%. 1600 g of quinoa powder, 400 g of taro whole powder, 120 g of banana powder, 60 g of kiwifruit powder, and 6 g of molecular distillation monoglyceride are evenly mixed and then tempered. After the tempering, the water content of the rice composite reaches 30%. A working temperature of a cavity of each machine section of the twin-screw extrusion machine is set as follows: a temperature gradient in Zone I is 50° C., Zone II 80° C., Zone III 120° C., Zone IV 110° C., and Zone V 25° C. The rotation speed of the screw is 250 rpm. After granulation and formation, the rice composite is dried through a low temperature fluidized bed at 50° C. for 5 h until the water content is 10%. After classification and packing into a finished product, the functional nutritional artificial rice is obtained.

Embodiment 3

The present disclosure provides a nutritional artificial rice and a preparation method thereof, and the specific steps are as follows:

The quinoa is washed in clean water and then soaked for 30 min at the soaking temperature of 40° C. The taro, after being peeled, is added with water according to a material-to-water ratio of 1:3 (W/W) to be beaten. The pretreated quinoa and taro are dried, pulverized and sieved with a 100-mesh sieve. The ball mill processing parameters for the quinoa powder are as follows: a capacity of a ball-milling tank is 600 mL, a rotation speed of the ball mill is 500 r/min, the milling time is 120 min, and a ball-to-material ratio is 8:1. The taro whole powder and the quinoa powder are pre-cured by microwave irradiation. With respect to the taro whole powder, the microwave power is 300 W, the microwave pre-curing time is 2 min, and the water content of the material is 30%. With respect to the quinoa powder, the microwave power is 400 W, the microwave pre-curing time is 3 min, and the water content of the material is 35%. 1400 g of quinoa powder, 600 g of taro whole powder, 160 g of banana powder, 80 g of kiwifruit powder, and 8 g of molecular distillation monoglyceride are evenly mixed and then tempered. After tempering, the water content of the rice composite reaches 40%. A working temperature of a cavity of each machine section of the twin-screw extrusion machine is set as follows: a temperature gradient in Zone I is 55° C., Zone II 85° C., Zone III 125° C., Zone IV 115° C., and Zone V 30° C. The rotation speed of the screw is 300 rpm. After granulation and formation, the rice composite is dried by a low temperature fluidized bed at 60° C. for 7 h until the water content is 12%. After classification and packing into a finished product, the functional nutritional artificial rice is obtained.

The formulas of the functional nutritional artificial rice prepared according to the present disclosure are shown in Table 1.

TABLE 1

| | Raw material formulas of the functional nutritional artificial rice | | | | |
|---|---|---|---|---|---|
| Sample | Taro whole powder (%) | Quinoa powder (%) | Banana powder (%) | Kiwifruit powder (%) | Molecular distillation monoglyceride (%) |
| Embodiment 1 | 10 | 90 | 4 | 2 | 0.2 |
| Embodiment 2 | 20 | 80 | 6 | 3 | 0.3 |
| Embodiment 3 | 30 | 70 | 8 | 4 | 0.4 |

Thermal properties of the nutritional artificial rice prepared according to the present disclosure are tested and shown in Table 2.

TABLE 2

Thermal properties of functional nutritional artificial rice

| Sample | $T_o$ (° C.) | $T_p$ (° C.) | Tc (° C.) | ΔHg (J/g) |
|---|---|---|---|---|
| Natural Rice | 65.84 ± 0.63 | 70.12 ± 0.76 | 73.41 ± 0.56 | 4.53 ± 0.49 |
| Embodiment 1 | 67.57 ± 0.26 | 71.96 ± 0.84 | 75.63 ± 0.45 | 5.92 ± 0.34 |
| Embodiment 2 | 68.74 ± 0.33 | 73.54 ± 0.39 | 77.12 ± 0.68 | 6.98 ± 0.51 |
| Embodiment 3 | 70.12 ± 0.42 | 75.48 ± 0.63 | 78.35 ± 0.46 | 7.24 ± 0.55 |

As can be seen from Table 2, the extrusion cooking has a significant influence on the thermal properties of the artificial rice. The gelatinization temperature parameters (onset gelatinization temperature $T_O$, peak gelatinization temperature Tp and crystallization gelatinization temperature Tc) of the nutritional artificial rice are higher than the gelatinization temperature parameters of the natural rice, and the gelatinization enthalpy of the nutritional artificial rice is increased.

The gelatinization properties of the nutritional artificial rice prepared according to the present disclosure are shown in Table 3.

TABLE 3

Gelatinization properties of the functional nutritional artificial rice

| Sample | Peak viscosity (cP) | Lowest viscosity (cP) | Final viscosity (cP) | Disintegration value (cP) | Retrogradation value (cP) | Gelatinization temperature (° C.) |
|---|---|---|---|---|---|---|
| Natural Rice | 2381.2 ± 39.4 | 1612.5 ± 38.2 | 3206.3 ± 46.8 | 768.7 ± 38.6 | 1593.8 ± 42.4 | 70.46 ± 0.46 |
| Embodiment 1 | 865.9 ± 46.3 | 564.4 ± 42.8 | 1172.5 ± 45.6 | 301.5 ± 43.9 | 608.1 ± 42.8 | 79.54 ± 0.58 |
| Embodiment 2 | 632.5 ± 41.8 | 436.2 ± 40.6 | 961.5 ± 42.9 | 196.3 ± 41.3 | 525.3 ± 41.6 | 82.67 ± 0.52 |
| Embodiment 3 | 716.8 ± 37.2 | 484.6 ± 39.7 | 1045.2 ± 50.6 | 232.2 ± 38.5 | 560.6 ± 43.7 | 81.29 ± 0.56 |

It can be seen from Table 3 that the respective gelatinization viscosities of the nutritional artificial rice are all lower than those of the natural rice, indicating that the addition amounts of quinoa, taro, banana powder, kiwifruit powder and molecular distillation monoglyceride have a significant effect on the gelatinization properties of the functional nutritional artificial rice. The retrogradation value of the functional nutritional artificial rice is significantly lower than that of the untreated rice. That is, unlike the case of the conventional rice, the functional nutritional artificial rice is unlikely to regenerate after being set aside, and the taste and nutrition can be better maintained. It has an important effect on the taste of functional nutritional artificial rice. Starch, protein and lipid in quinoa are rearranged during the extrusion process, so as to form a more stable spatial structure, which indicates that the reconstitution among the starch, protein and lipid has a significant inhibitory effect on the retrogradation of the artificial rice.

Figure 2:
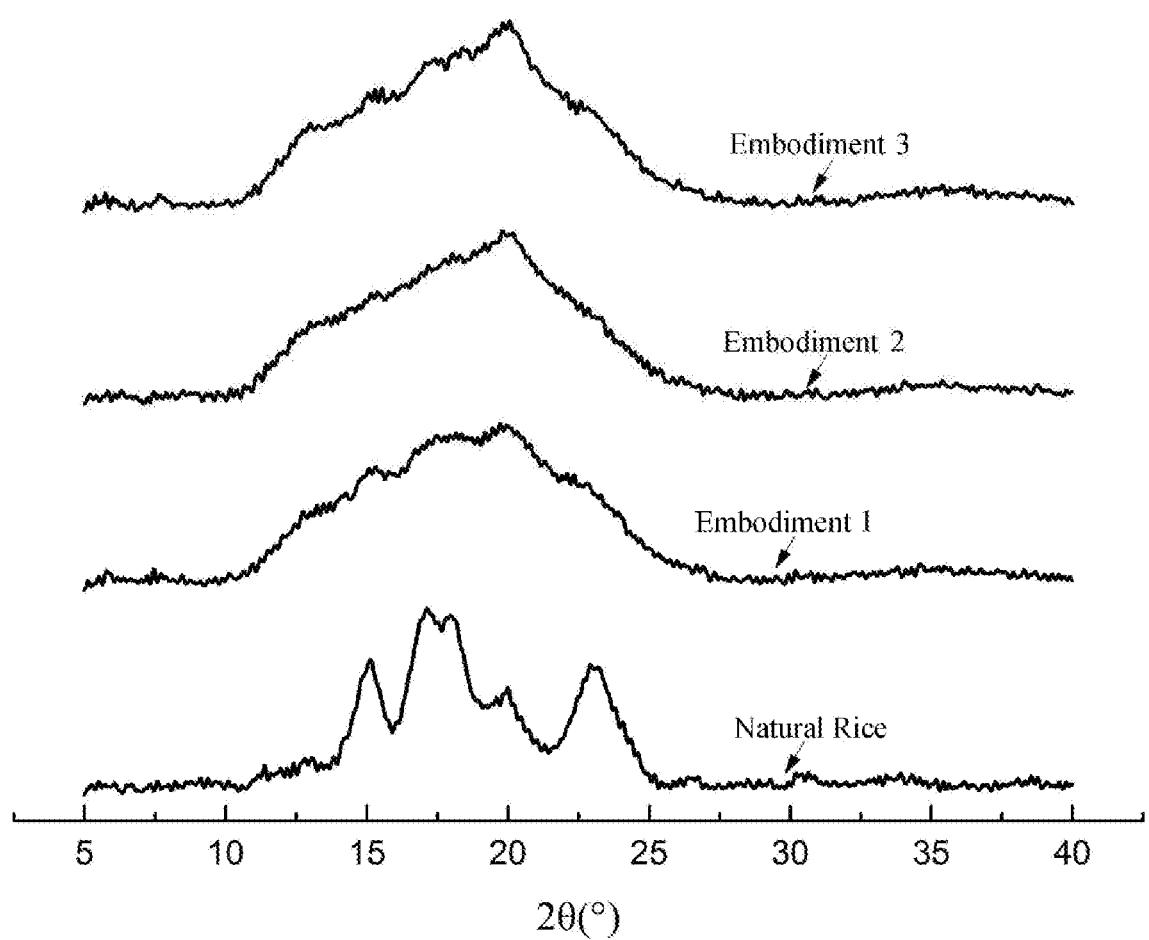
FIG. 2 is an X-ray diffraction comparison of natural rice and the nutritional artificial rice.

The crystallization properties of the nutritional artificial rice prepared according to the present disclosure are shown in FIG. 2. It can be seen from FIG. 2 that the natural rice exhibits significant characteristic peaks at 14.9°, 17°, 18° and 23°, which are typical characteristic peaks of "A"-type crystal. The X-Ray spectrum of the artificial rice, which is formed through extrusion puffing and granulation, is different from that of the natural rice. Under the high temperature and pressure, the crystals of taro starch particles and quinoa starch particles are destroyed. The artificial rice has a reduced ordering degree of the starch lattice, and an increased amorphous zone. Therefore, peak shape is de-sharpened, and several characteristic peaks disappear. Due to the presence of the external force, the particle morphology of the starch is destroyed, and the microcrystalline structure of the starch gradually transforms into a sub-microcrystalline structure.

Figure 3:
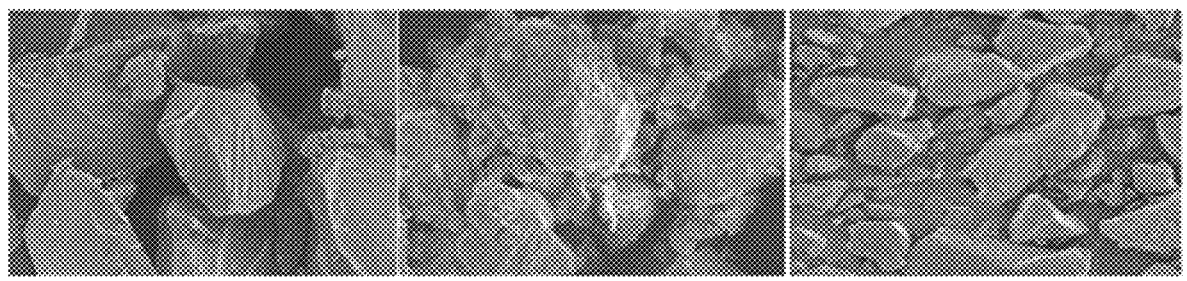
FIG. 3 illustrates scanning electron micrographs of natural rice and the nutritional artificial rice;
(a) Embodiment 1 (b) Embodiment 2 (c) Embodiment 3.

FIG. 3 shows the scanning electron micrographs of the functional nutritional artificial rice prepared in accordance with the present disclosure. It can be seen from FIG. 3 that the morphological properties of the functional nutritional artificial rice particles have changed significantly and are presented as the angular and rocky shape. The reason is in that, the extrusion shear action of the twin-screw and the strong friction between the material and the screw or the barrel cause the disappearing of the initial starch crystal structure, and the starch molecules are partially degraded and are presented in a porous shape. The functional nutritional artificial rice, which is added with quinoa, taro, banana powder, kiwifruit powder and molecular distillation monoglyceride, has an irregular network structure.

The digestion properties of the nutritional artificial rice prepared according to the present disclosure are shown in Table 4. The contents of the slow-digestive starch and resistant starch of the natural rice are lower than those of the nutritional artificial rice. The content of the fast-digestive starch of the nutritional artificial rice is lower than that of the natural rice. It indicates that the digestibility of the starch of the nutritional artificial rice is inhibited. The content of the resistant starch can affect the degradation ability of microorganisms in the colon. A high content of the resistant starch reduces the possibility of digestion and absorption of starch in the human body, and thus can increase satiety and act as a good dietary fiber. The reduced content of the fast-digestive starch in functional nutritional artificial rice can effectively inhibit the increase of blood sugar.

TABLE 4

Digestion properties of functional nutritional artificial rice

| Sample | RDS/% | SDS/% | RS/% |
|---|---|---|---|
| Natural Rice | 45.46 ± 1.25a | 37.96 ± 1.42c | 16.58 ± 0.49d |
| Embodiment 1 | 41.01 ± 0.43b | 40.03 ± 0.89bc | 18.96 ± 0.19c |
| Embodiment 2 | 38.23 ± 0.71c | 41.69 ± 1.07b | 20.08 ± 0.47b |
| Embodiment 3 | 34.09 ± 1.22d | 44.14 ± 1.55a | 21.77 ± 0.10a |

The above is only preferred embodiments of the present disclosure and is not intended to limit the present disclosure. Any modifications, equivalent substitutions and improvements made within the spirit and principles of the present disclosure should be included in the scope of the present disclosure.

What is claimed is:

1. A preparation method of a nutritional artificial rice, comprising:
   pre-curing quinoa by microwave irradiation after washing, soaking, pulverizing, ball-milling, and tempering the quinoa;
   pre-curing taro by microwave irradiation after cleaning, beating, drying, pulverizing, tempering the taro;
   evenly mixing a pre-cured taro whole powder and a pre-cured quinoa powder with a banana powder, a kiwifruit powder and a molecular distillation monoglyceride; and
   granulation molding, drying and polishing a mixture to obtain the functional nutritional artificial rice.

2. The preparation method of a nutritional artificial rice according to claim 1, comprising the following steps:
   (1) pretreating the quinoa: removing impurities adhered to a surface of the quinoa and then sufficiently soaking the quinoa in water for 5 min to 40 min at a soaking temperature of 20° C. to 40° C. in such a manner that particles of the quinoa sufficiently absorb water and swell, and then drying the quinoa to be standby;
   (2) pretreating of the taro: removing impurities adhered to a surface of the taro, peeling the taro, adding water with a material-to-water ratio of 1:2-3 (W/W) to beat the taro, and drying the taro to be standby;
   (3) pulverizing: pulverizing the pretreated quinoa and the pretreated taro, and then sieving with an 80-200 mesh sieve to obtain the quinoa powder and the taro whole powder;
   (4) ball-milling the quinoa powder: treating the sieved quinoa powder through a ball mill to be standby, wherein parameters of the ball mill comprise: a capacity of a ball-milling tank being 150 mL to 650 mL, a rotation speed of the ball mill being 200 r/min to 550 r/min, a milling time being 10 min to 200 min, and a ball-to-material ratio being (1 to 10):1;
   (5) pre-curing the taro whole powder and the quinoa powder in separate steps;
   (6) premixing: in a percentage of a total weight of the taro whole powder and the quinoa powder, weighing 10% to 40% of the taro whole powder and 60% to 90% of the quinoa powder, and then adding 0.1% to 0.5% of the molecular distillation monoglyceride, 0% to 10% of the banana powder and 0% to 5% of the kiwifruit powder;
   (7) tempering: mixing the quinoa powder, the taro whole powder, the banana powder, the kiwifruit powder and the molecular distillation monoglyceride in a mixer, and adjusting a water content of the mixture into a range of 20% to 45%;
   (8) granulation molding: quantitatively adding a tempered composite material into a twin-screw extrusion machine through a feeder, wherein the machine is a co-directional or a counter-directional rotating twin-screw extrusion machine having a three-section temperature control and a length-to-diameter ratio of (16 to 26):1; setting a working temperature of a cavity of each machine section of the twin-screw extrusion machine, wherein a temperature gradient in Zone I is 45° C. to 65° C., Zone II 75° C. to 95° C., Zone III 115° C. to 135° C., Zone IV 105° C. to 115° C., Zone V 20° C. to 35° C., a rotation speed of a screw is 120 rpm to 370 rpm; extruding the composite material by a mold having a circular mold hole with a diameter of 1 mm to 7 mm, wherein the composite material is formed as gelatinization particles during conveying, extruding and curing through the twin-screw extrusion machine;
   (9) low-temperature fluidized bed drying: drying the nutritional artificial rice at a temperature of 40° C. to 60° C. for 1-8 h until the water content is 8% to 12%;
   (10) polishing: performing polishing treatment after finishing the drying;
   (11) packaging: weighing and then packaging the polished nutritional artificial rice.

3. The preparation method of a nutritional artificial rice according to claim 1, wherein in the step (5), parameters for pre-curing the taro whole powder are set as follows: a microwave irradiation power being 100 W to 300 W, an irradiation time being 1 min to 5 min, and a water content of the taro whole powder being 10% to 30%, and
   parameters for pre-curing the quinoa powder are set as follows: a microwave irradiation power being 200 W to 400 W, an irradiation time being 2 min to 6 min, and a water content of the quinoa whole powder being 15% to 35%.

4. A nutritional artificial rice, prepared by the preparation method according to claim 1.

5. A nutritional artificial rice, prepared by the preparation method according to claim 2.

* * * * *